(12) United States Patent
Klinder et al.

(10) Patent No.: US 8,658,979 B2
(45) Date of Patent: Feb. 25, 2014

(54) NUCLEAR IMAGE RECONSTRUCTION

(75) Inventors: Tobias Klinder, Uelzen (DE); Cristian Lorenz, Hamburg (DE); Michael H. Kuhn, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 241 days.

(21) Appl. No.: 13/145,132

(22) PCT Filed: Jan. 15, 2010

(86) PCT No.: PCT/IB2010/050189
§ 371 (c)(1),
(2), (4) Date: Jul. 19, 2011

(87) PCT Pub. No.: WO2010/084441
PCT Pub. Date: Jul. 29, 2010

(65) Prior Publication Data
US 2011/0284751 A1 Nov. 24, 2011

(30) Foreign Application Priority Data
Jan. 22, 2009 (EP) .................................... 09151066

(51) Int. Cl.
*G01T 1/161* (2006.01)
*G01D 18/00* (2006.01)
*G12B 13/00* (2006.01)

(52) U.S. Cl.
USPC .................................. 250/363.02; 250/252.1

(58) Field of Classification Search
USPC .......................................... 250/363.02, 252.1
See application file for complete search history.

(56) References Cited

U.S. PATENT DOCUMENTS

| 6,185,446 | B1 * | 2/2001 | Carlsen, Jr. ................... 600/411 |
| 2006/0235295 | A1 | 10/2006 | Boese et al. |
| 2006/0284097 | A1 | 12/2006 | Wang et al. |
| 2007/0232903 | A1 | 10/2007 | Hamill |
| 2008/0107229 | A1 | 5/2008 | Thomas et al. |
| 2008/0226149 | A1 | 9/2008 | Wischmann et al. |
| 2008/0287772 | A1 * | 11/2008 | Declerck et al. .............. 600/411 |

FOREIGN PATENT DOCUMENTS

| WO | 03107275 A2 | 12/2003 |
| WO | 2004042546 A1 | 5/2004 |
| WO | 2007015199 A2 | 2/2007 |
| WO | 2007074467 A2 | 7/2007 |
| WO | 2008155738 A2 | 12/2008 |

OTHER PUBLICATIONS

Segars, W. P., et al.; CT-PET Image Fusion using the 4D NCAT Phantom with the Purpose of Attenuation Correction; 2002; IEEE Nuclear Science Symposium Conf. Record; vol. 3; pp. 1775-1779.

* cited by examiner

*Primary Examiner* — David Porta
*Assistant Examiner* — Abra Fein

(57) ABSTRACT

A system is provided for obtaining a nuclear image of a moving object. The system comprises an input (14), a processing unit (15) and an output (17). The input (14) is provided for receiving a nuclear image and morphological images of the object. The processing unit (15) is configured to process the morphological images to obtain sparse motion information of the object, to use the sparse motion information and a motion model for obtaining estimated motion information about the object, and to generate a motion-corrected nuclear image based on the estimated motion information and the acquired nuclear image. The output (17) provides the corrected nuclear image.

20 Claims, 2 Drawing Sheets

NUCLEAR IMAGE RECONSTRUCTION

FIELD OF THE INVENTION

This invention relates to a system for obtaining a nuclear image of an object, the system comprising an input for receiving a nuclear image and a morphological image of the object, a processing unit being configured to process the images and to generate a corrected nuclear image, using the morphological image, and an output for providing the corrected nuclear image.

This invention further relates to a method of obtaining a nuclear image of a moving object.

The invention also relates to a computer program product.

BACKGROUND OF THE INVENTION

Single Photon Emission Computed Tomography (SPECT) and Positron Emission Tomography (PET) are the most common devices in nuclear medicine imaging, which is used to provide important information of, e.g., heart function or tumor growth and location. A complicating factor in SPECT and PET procedures is that breathing of the patients results in motion of the imaged objects.

In contrast to CT where a beam is sent through the body and detectors measure the line integral on the opposite side, the signal in SPECT and PET comes from a radioactive tracer being inside the body. Thus, the exact location of the source of the signal is a-priori not known, so that it is also unknown how much of the signal was absorbed by other structures on the way to the detector. However, when morphological and material information about the acquired region is additionally provided, absorption correction can be performed on the SPECT or PET image. The necessary information is typically provided by additionally acquiring MRI or CT images, where MRI is attractive due to the fact that it does not expose the subject to ionizing radiation while CT has the advantage that attenuation properties can be directly derived from the data. The corresponding maps that contain the absorption information in the morphological image are called attenuation maps.

Since the patient breathes freely during image acquisition, the obtained SPECT and PET images contain severe motion artifacts. During respiratory motion many organs are at a largely different location with most of them also being significantly deformed. Due to this respiratory motion, it is very difficult to provide an accurate attenuation map for providing the correct morphological information for the nuclear images. In this context, it has to be noted that breath-holding is not an option due to the long acquisition time of SPECT and PET scans.

In the past, some solutions have been proposed for dealing with the problems caused by motion of the object in nuclear imaging. The international patent application published as WO 03/107275 describes the use of a motion model in combination with acquired CT images in order to generate a subject-specific physiological model. The subject specific model is used for the registration of the CT images and PET images. The use of the motion model facilitates the registration of spatially aligned images. Although this published patent application does provide a method for accurate spatial alignment of images from different imaging devices, the quality of the registered nuclear images is still strongly affected by the respiratory motions of the patient.

SUMMARY OF THE INVENTION

It is an object of the invention to provide a method of obtaining a high quality nuclear image of a moving object.

The invention is defined by the independent claims. Advantageous embodiments are defined in the dependent claims.

According to a first aspect of the invention, this object is achieved by providing a system for obtaining a nuclear image of a moving object, the system comprising an input for receiving a nuclear image and morphological images of the object, a processing unit being configured to generate a motion-corrected nuclear image based on estimated motion information and the acquired nuclear image, and an output for providing the corrected nuclear image. The processing unit is further configured to process the morphological image to obtain sparse motion information of the object and to use the sparse motion information and a motion model for obtaining the estimated motion information about the object.

When, e.g., acquiring nuclear images of the thorax or upper abdomen of a patient, time-varying morphological information is needed in order to strictly provide the correct morphological information for the corresponding nuclear image, and not information of a different time in the breathing cycle where many organs are at a largely different location with most of them being also significantly deformed. Although devices are available that combine SPECT/PET with MRI/CT in one scanner setup, such devices are not able to provide accurate morphological information suitable for correcting the nuclear images in real time. For example, MRI and CT scanners are not able to acquire images of a large field of view in real-time. Furthermore, the required processing of the MRI/CT scans in real time would require a huge amount of computing power.

With the system according to the invention, the estimation of patient motion and organ deformation is supported via optimized acquisition protocols on morphological imaging devices by including a-priori breathing information in form of a breathing model in the estimation process. Thus, time-varying morphological information for correcting the nuclear images, which significantly improves the image quality of the respective images, can be obtained in a much more efficient manner. With the sparse motion information, the above motion model (preferably derived from a representative patient population) can be adapted or parameterized, so that the patient specific motion can be estimated, e.g., in the form of a motion vector field, throughout the entire body. Thus, the main advantage is that the scanner does not need to acquire the detailed motion in the complete region of interest, but only at a few key locations. With the estimated dense motion information, estimated motion information can be generated and used for nuclear image reconstruction.

It is to be noted that WO 03/107275 A1 discloses the use of CT-based attenuation maps for correcting the nuclear (PET) images. However, the attenuation is performed in the usual way. The motion model is only used for improving the registration of the images from different imaging devices, not for improving the correction of the nuclear images.

In preferred embodiments, the system comprises the nuclear imaging device and/or the morphological imaging device.

The processing unit may be configured to generate a time-varying attenuation map based on the estimated motion information, and to correct the acquired nuclear image, using the time-varying attenuation map. With a time-varying attenuation map, the nuclear images may be corrected in real time to provide high quality nuclear images in a very efficient way.

According to a second aspect of the invention, a method is provided of obtaining a nuclear image of a moving object, the method comprising the steps of using a nuclear imaging device for acquiring a nuclear image of the object, using a morphological imaging device for acquiring morphological images of the object, processing the morphological image to obtain sparse motion information of the object, using the sparse motion information and a motion model for obtaining estimated motion information about the object, and generating a motion-corrected nuclear image based on the estimated motion information and the acquired nuclear image.

According to another aspect of the invention, the system is comprised in a workstation.

According to a further aspect of the invention, a computer program product is provided for causing a processor to perform the above described method.

It will be appreciated by those skilled in the art that two or more of the above-mentioned embodiments, implementations, and/or aspects of the invention may be combined in any way deemed useful.

Modifications and variations of the method, of the workstation, of the system, and/or of the computer program product, which correspond to the described modifications and variations of the method or the system, can be carried out by a person skilled in the art on the basis of the present description.

These and other aspects of the invention are apparent from and will be elucidated with reference to the embodiments described hereinafter.

DETAILED DESCRIPTION OF THE INVENTION

Figure 1:
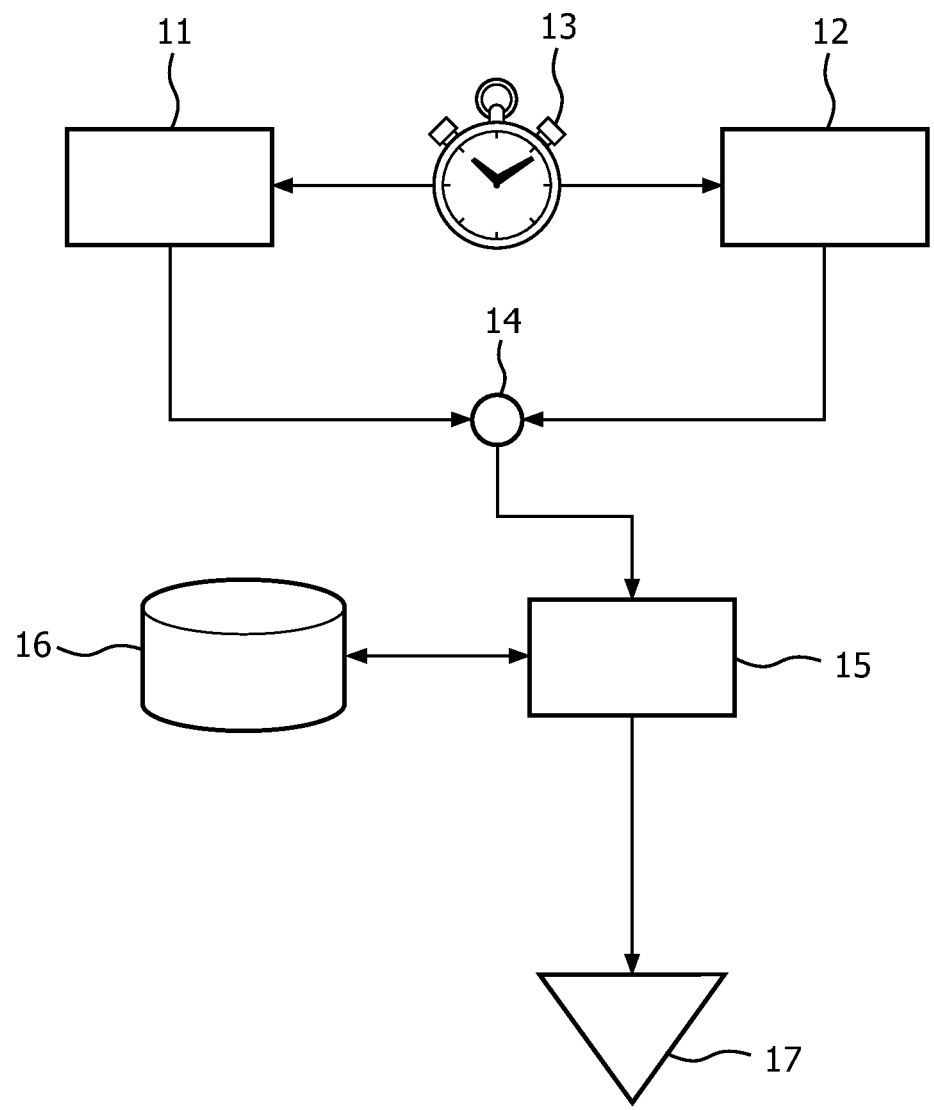
FIG. 1 schematically shows an embodiment of a system according to the invention.

FIG. 1 schematically shows an embodiment of an image processing system according to the invention. The system comprises an input 14 for receiving images from a nuclear imaging device 11 and from a morphological imaging device 12. The nuclear imaging device 11 may, e.g., be a PET or SPECT scanner. The morphological imaging device 12 may, e.g., be an MRI or CT scanner. In the following, an exemplary embodiment using a PET scanner and an MRI scanner is used to illustrate the invention. Both the PET scanner 11 and the MRI scanner 12 are used for making images of a selected region of a patient.

In the following, this region is assumed to be the thorax/lungs/upper body of a patient. However, the system may also advantageously be used for examinations of the heart or abdominal regions, such as the liver. The signal in the PET scanner 11 comes from a radioactive tracer being inside the body of the patient under examination. The PET scanner 11 detects the radioactive signal and adds a time stamp for the time of detection. A clock 13 is provided for adding the time stamp. The MRI scanner 12 also scans the patient at certain important locations for providing sparse motion information. Also the measurements provided by the MRI scanner 12 are provided with a time stamp. Preferably, the PET images and the MRI images are obtained simultaneously and both scanners 11, 12 use the same clock 13 for adding the time stamps. However, it is also possible to make a good estimation of motions of the patient, when performing the PET scan and the MRI scan at different moments and when using separate clocks for adding the time stamps. The PET scanner 11 and/or the MRI scanner 12 may be integrated in the image processing system, or the image processing system may be coupled to one or both scanners 11, 12 via an input 14.

A processing unit 15 is provided for processing the obtained PET and MRI images. The MRI images comprise morphological information about the examined region. Together with a motion model stored in storage unit 16, the morphological images are used for determining sparse motion information. In this example, respiratory motion is the most important type of motion influencing the quality of the PET images of the lung area. Consequently, the motion model that is used is a breathing model. In other situations, other motion models or combinations of motion models may be needed. For example, a cardiac motion model may model a patient's beating hart.

Since the breathing model covers typical breathing characteristics, it can be parameterized and adapted to estimate the patient's specific respiratory motion from a reduced set of measurements acquiring breathing information obtained at a few key locations, e.g., provided by MR navigator echoes (fast acquisition of signals along a "pencil beam" and estimating the position of tissue transitions from the signal change along this line), or from key projections of a CT scan at key locations.

Because of the respiratory motion of the patient, multiple MRI images are needed for obtaining sufficient information to generate accurate sparse motion information. With this sparse motion information the above motion model (preferably derived from a representative patient population) can be adapted/parameterized, such that the patient-specific motion can be estimated, e.g., in the form of a motion vector field. Thus, the main advantage is that the MRI scanner 12 does not need to acquire the detailed motion in the complete region of interest, but only at a few key locations. With the estimated dense motion field, a time-varying attenuation map can be generated and used for correction of the PET images.

For hybrid systems, consisting of a SPECT/PET system next to an MR/CT system, this allows shortening of the total acquisition and examination time. For systems in a co-planar fashion, in which the SPECT/PET and MR/CT image acquisition take place simultaneously, the reduction of the time necessary for obtaining the motion information becomes very important, because the main task of the MR/CT scanner is to acquire a diagnostic scan of the volume-of-interest, which must not be significantly disturbed.

The estimated motion information, as derived from the sparse motion information and the motion model, is used for correcting the obtained PET images. The corrected images may also be stored in the storage unit 16. The correction of the PET images may be done using an attenuation map. The attenuation map contains absorption information of the anatomical structures in the region imaged by the MRI scanner.

The corrected PET images are provided at an output 17 of the system. For example, the corrected images are displayed on a display screen.

Figure 2:
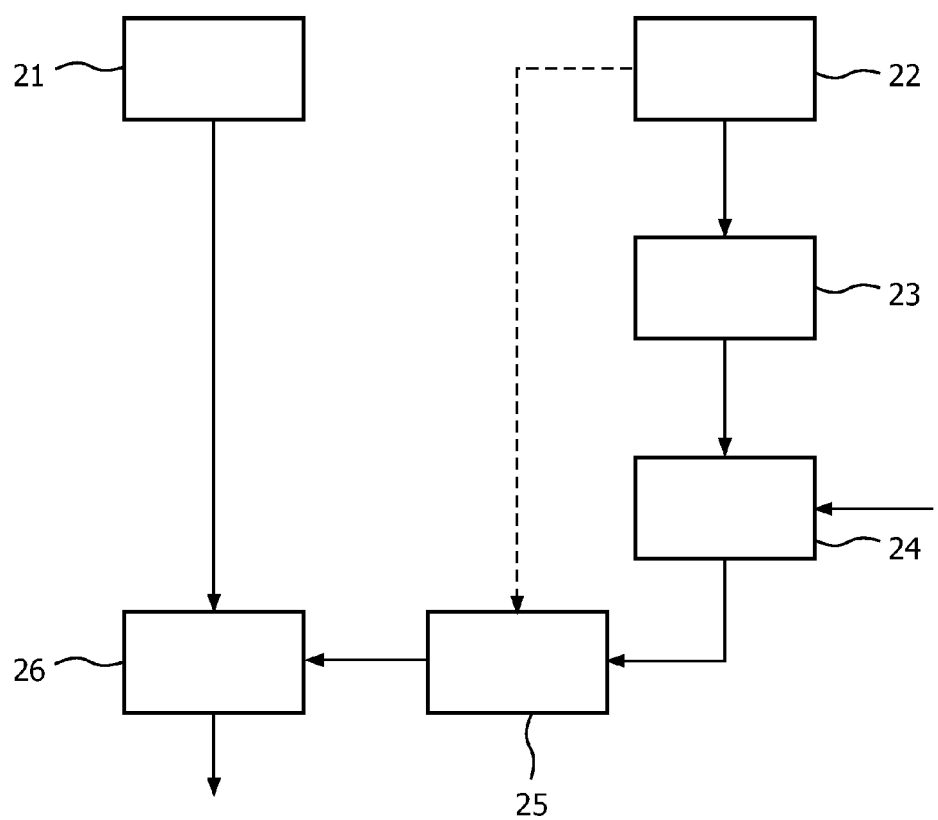
FIG. 2 shows a flow diagram of an exemplary method according to the invention.

FIG. 2 shows a flow diagram of an exemplary method according to the invention. The method starts with acquiring images, using a nuclear imaging apparatus in nuclear imaging step 21, and acquiring images, using a morphological imaging device in morphological imaging step 22. These steps 21, 22 may be performed simultaneously, but may also be separated in time. In sparse motion extraction step 23, the processing unit 15 derives a sparse motion map from the obtained morphological images. This may, e.g., be done by tracing a few clearly recognizable key locations in successive images. In motion estimation step 24, the sparse motion map is combined with a motion model to obtain estimated motion information about the imaged object or region. The estimated motion information may, e.g., be in the form of a motion vector field. The motion model is, preferably, derived from a representative patient population. The estimated motion as determined in motion estimation step 24 is used for providing a correction scheme for the nuclear images. This correction scheme is computed in correction preparation step 25. The correction scheme may, e.g., be a time-varying attenuation map. In addition to the estimated motion, also one or more of the unprocessed morphological images may be used as input for correction preparation step 25. In correction step 26, the nuclear images are corrected using the correction scheme. The output may then be provided to the user, e.g., via a display.

It will be appreciated that the invention also extends to computer programs, particularly computer programs on or in a carrier, adapted for putting the invention into practice. The program may be in the form of source code, object code, a code intermediate source and object code such as a partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer-executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer-executable instructions corresponding to each of the processing steps of at least one of the methods set forth. These instructions may be subdivided into subroutines and/or stored in one or more files that may be linked statically or dynamically. Another embodiment relating to a computer program product comprises computer-executable instructions corresponding to each of the means of at least one of the systems and/or products set forth. These instructions may be subdivided into subroutines and/or stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means. When the program is embodied in such a signal, the carrier may be constituted by such a cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for obtaining a nuclear image of a moving object, the system comprising:
   an input for receiving a nuclear image and morphological images of the object,
   a processing unit being configured to:
   process the morphological images to obtain sparse motion information of the object from only a predetermined sub-set of locations in successive images of the morphological images,
   derive a reduced set of measurements from a fast acquisition of signals along a pencil beam;
   parameterize and adapt a motion model to provide an estimate of a motion of a patient from the reduced set of measurements,
   use the sparse motion information and the motion model to obtain estimated motion information about the object,
   generate a motion-corrected nuclear image based on the estimated motion information and the acquired nuclear image, and
   an output for providing the corrected nuclear image.

2. The system as claimed in claim 1, further comprising a nuclear imaging device for acquiring the nuclear image of the object.

3. The system as claimed in claim 2, wherein the nuclear imaging device is a PET or SPECT scanner.

4. The system as claimed in claim 2, further comprising a morphological imaging device for acquiring the morphological image of the object.

5. The system as claimed in claim 4, wherein the morphological imaging device is an MRI or a CT scanner.

6. The system as claimed in claim 1, wherein the processing unit is configured to obtain the estimated motion information in the form of a motion vector field, and wherein the processing unit is further configured to generate the motion-corrected nuclear image based on the motion vector field and the acquired nuclear image.

7. The system as claimed in claim 1, wherein the processing unit is further configured to generate a time-varying attenuation map based on the estimated motion information, and to correct the acquired nuclear image, using the time-varying attenuation map.

8. A hardware computer comprising the system as claimed in claim 1.

9. The system as claimed in claim 1, further comprising:
   compute a correction scheme based on the estimated motion information and one or more of the received unprocessed morphological images; and
   correct the received nuclear image using the correction scheme.

10. The system as claimed in claim 1, further comprising:
    derive the motion model from a representative patient population.

11. The system as claimed in claim 1, wherein the motion model is a respiratory motion model.

12. The system as claimed in claim 11, wherein the moving object includes lungs of the patient.

13. The system as claimed in claim 12, wherein the reduced set of measurements includes MR navigator echoes.

14. The system as claimed in claim 12, wherein the reduced set of measurements are derived by estimating a position of tissue transitions from a signal change along the pencil beam.

15. The system as claimed in claim 1, further comprising:
generate the sparse motion information from multiple MRI images.

16. The system as claimed in claim 15, wherein the multiple MRI images do not provide motion information for a complete region of interest, but only at a sub-set of locations in the region of interest.

17. A method of obtaining a nuclear image of a moving object, the method comprising the steps of:
using a nuclear imaging device for acquiring a nuclear image of the object,
using a morphological imaging device for acquiring morphological images of the object,
processing the morphological images to obtain sparse motion information of the object,
parameterizing and adapting a motion model to provide an estimate of a specific respiratory motion of a patient from a reduced set of measurements, wherein the reduced set of measurements is derived from a fast acquisition of signals along a pencil beam by estimating a position of tissue transitions from a signal change along the pencil beam;
using the sparse motion information and the motion model for obtaining estimated motion information about the object,
computing a correction scheme based on both the estimated motion information and one or more of the received unprocessed morphological images; and
generating a motion-corrected nuclear image based on the correction scheme and the acquired nuclear image.

18. The method as claimed in claim 17, wherein the estimated motion information comprises a motion vector field, and wherein the generation of the motion-corrected nuclear image is based on the motion vector field and the acquired nuclear image.

19. The method as claimed in claim 17, wherein the generation of the motion-corrected nuclear image comprises the steps of:
generating a time-varying attenuation map based on the estimated motion information, and
using the time-varying attenuation map for correcting the acquired nuclear image to obtain the motion-corrected nuclear image.

20. A computer program product, which program is operative to cause a processor to perform a method as claimed in claim 17.

* * * * *